United States Patent
Kim et al.

(10) Patent No.: US 12,206,130 B2
(45) Date of Patent: Jan. 21, 2025

(54) COMPOSITE SEPARATOR AND ELECTROCHEMICAL DEVICE INCLUDING THE SAME

(71) Applicants: SK Innovation Co., Ltd., Seoul (KR); SK ie technology Co., Ltd., Seoul (KR)

(72) Inventors: Sun Young Kim, Daejeon (KR); Tae Wook Kwon, Daejeon (KR); Heung Taek Bae, Daejeon (KR); Dong Gun Lee, Daejeon (KR); Yun Bong Kim, Daejeon (KR); Min Kyung Seon, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 111 days.

(21) Appl. No.: 17/407,382

(22) Filed: Aug. 20, 2021

(65) Prior Publication Data

US 2022/0059903 A1 Feb. 24, 2022

(51) Int. Cl.
*H01M 50/42* (2021.01)
*C08F 20/06* (2006.01)
*C08F 20/56* (2006.01)
*H01M 10/052* (2010.01)
*H01M 50/431* (2021.01)
*H01M 50/449* (2021.01)
*H01M 50/491* (2021.01)

(52) U.S. Cl.
CPC .............. *H01M 50/42* (2021.01); *C08F 20/06* (2013.01); *C08F 20/56* (2013.01); *H01M 10/052* (2013.01); *H01M 50/431* (2021.01); *H01M 50/449* (2021.01); *H01M 50/491* (2021.01)

(58) Field of Classification Search
CPC .............. H01M 50/491; H01M 50/449; H01M 50/431; H01M 10/052; H01M 50/42; C08F 20/06; C08F 20/56
USPC .......................................... 429/251
See application file for complete search history.

(56) References Cited

U.S. PATENT DOCUMENTS

| | | | |
|---|---|---|---|
| 10,361,434 B2 * | 7/2019 | Okada | H01M 4/622 |
| 10,840,493 B2 | 11/2020 | Seo et al. | |
| 2018/0337381 A1 * | 11/2018 | Seo | H01M 4/525 |
| 2021/0226299 A1 | 7/2021 | Choi et al. | |
| 2021/0408638 A1 | 12/2021 | Choi et al. | |
| 2022/0037741 A1 | 2/2022 | Lee et al. | |

FOREIGN PATENT DOCUMENTS

| | | | | |
|---|---|---|---|---|
| JP | 6579383 B2 | | 9/2019 | |
| KR | 20130114153 A | * | 10/2013 | |
| KR | 101841809 B1 | | 5/2016 | |
| KR | 20180099560 A | * | 5/2018 | |
| KR | 20180099561 A | * | 9/2018 | ........ H01M 10/0525 |
| KR | 20180109740 A | * | 10/2018 | ........ H01M 10/0525 |
| KR | 1020180109740 A | | 10/2018 | |
| KR | 102071387 B1 | | 1/2020 | |
| WO | 2020060018 A1 | | 3/2020 | |
| WO | 2020111432 A1 | | 6/2020 | |
| WO | WO2020130270 A1 | * | 6/2020 | |

OTHER PUBLICATIONS

KR20180099561A, modified translation as taught by Naoki et al. (Year: 2018).*
Han et al., Electrochemical lithiation performance and characterization of silicon-graphite composites with lithium, sodium, potassium, and ammonium polyacrylate binders (Year: 2015).*
KR20130114153A, modified translation as taught by Kaneda et al (Year: 2013).*
Sigma Aldrich-meth allyl sulfonic acid salr (2-methyl-2-propene-1-Sodium sulfonate) (Year: 2023).*
KR20180109740A, modified translation as taught by Ozaki et al (Year: 2018).*
KR 20180099560 A (english trnalation as taught by Ozaki) (Year: 2018).*
WO2020130270A1, Lee rt al, US 2022/0037741 A1 used as equivalent for translations (Year: 2020).*

* cited by examiner

*Primary Examiner* — Jonathan G Jelsma
*Assistant Examiner* — Omar M Kekia
(74) *Attorney, Agent, or Firm* — The Webb Law Firm

(57) ABSTRACT

Provided are a composite separator including a coating layer including inorganic particles and a binder formed on a porous substrate, which has improved coatability and improved thermal shrinkage, and a lithium secondary battery using the same.

12 Claims, No Drawings

COMPOSITE SEPARATOR AND ELECTROCHEMICAL DEVICE INCLUDING THE SAME

CROSS-REFERENCE TO RELATED APPLICATIONS

This application claims priority to Korean Patent Application Nos. 10-2020-0105011 filed Aug. 21, 2020 and 10-2021-0108437 filed Aug. 18, 2021, the disclosures of which are hereby incorporated by reference in their entirety.

BACKGROUND OF THE INVENTION

Field of the Invention

The following disclosure relates to a composite separator including a coating layer having inorganic particles and a binder formed on a porous substrate, which has improved coatability and improved thermal shrinkage, and an electrochemical device using the same, more specifically, a lithium secondary battery.

Description of Related Art

A composite separator is a porous film disposed between a positive electrode and a negative electrode of a battery, and is a subsidiary material which provides a migration path of a lithium ion by impregnating internal pores of a film with an electrolyte solution and prevents an internal short circuit of the positive electrode and the negative electrode even when a temperature of a battery is excessively raised or external impact is applied, and thus, plays an important role in securing battery safety.

Since the composite separator has an increased area of an electrode plate with a higher capacity of a secondary battery and includes more positive electrode or negative electrode active materials in the same area, a problem arises in battery safety, and thus, high mechanical strength is required simultaneously with high thermal stability for improving safety during battery manufacturing process and use. When thermal stability is lowered, an inter-electrode short circuit due to damage or deformation of the separator caused by a temperature rise in the battery may occur, thereby increasing a risk of overheating of the battery or the battery catching on fire.

In order to solve the problems, a porous coating layer coated on the composite separator should contain sufficient inorganic particles, but as the content of the inorganic particles is increased, the inorganic particles are desorbed in a manufacturing process of an electrochemical device such as winding, which acts as a defect to threaten battery stability and suppresses thermal shrinkage with weak adhesive strength, and thus, when overheated, a short circuit may occur, and when the binder is used in a large amount, thermal shrinkage is not suppressed.

SUMMARY OF THE INVENTION

An embodiment of the present invention is directed to providing a composite separator which has excellent coatability and improved leveling so that unwanted stripes are not formed and a uniform and plat coating layer is formed even with a minimized content of a binder and a maximized content of inorganic particles, by applying a specific binder.

Another embodiment of the present invention is directed to providing a composite separator which has high adhesive strength, does not cause desorption of inorganic particles, and thus, has significantly improved thermal shrinkage.

Another embodiment of the present invention is directed to providing a composite separator which has a thermal shrinkage rate of 5% or less, specifically 3% or less both in a machine direction (MD) and in a transverse direction (TD) after being allowed to stand at 150° C. for 1 hr, even with a use of a relatively small amount of a binder.

Another embodiment of the present invention is directed to providing a composite separator which does not cause inorganic particles forming a coating layer to be released under a stress occurring in a manufacturing process of a battery, and thus, may suppress a short circuit even in the case of overheating.

Still another embodiment of the present invention is directed to providing an electrochemical device, more specifically a lithium secondary battery, having improved stability and excellent electrical properties, by applying the composite separator.

In one general aspect, a composite separator includes: a porous substrate and a coating layer including a binder and inorganic particles formed on one surface or both surfaces of the porous substrate,
wherein the binder includes a copolymer including: (a) a unit derived from (meth)acrylamide; (b) a unit derived from any one or more selected from (b-1) (meth)acrylic acid and (b-2) a (meth)acrylic acid salt; and (c) a unit derived from an addition-polymerizable monomer containing a sulfonate.

In another general aspect, a lithium secondary battery includes the composite separator according to the embodiment between a positive electrode and the negative electrode.

In still another general aspect, a binder for a separator, the separator including a coating layer including inorganic particles and the binder on one surface or both surfaces of a porous substrate, includes a copolymer including: (a) a unit derived from (meth)acrylamide; (b) a unit derived from any one or more selected from (b-1) (meth)acrylic acid and (b-2) a (meth)acrylic acid salt; and (c) a unit derived from an addition-polymerizable monomer containing a sulfonate.

Other features and aspects will be apparent from the following detailed description, the drawings, and the claims.

DESCRIPTION OF THE INVENTION

Hereinafter, the present invention will be described in more detail by the attached specific examples or exemplary embodiments. However, the following exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, "(meth)acryl" refers to acryl and/or methacryl.

An exemplary embodiment of the present invention may provide a composite separator satisfying a thermal shrinkage rate of 5% or less, specifically 3% or less, more specifically 2.5% or less, and more specifically 2% or less in both a machine direction (MD) and in a transverse direction (TD) after being allowed to stand at 150° C. for 1 hr, even with a use of a relatively small amount of a binder, by adopting a binder having excellent coatability and leveling properties, and also, may provide a lithium secondary battery having excellent stability by using the composite separator.

The composite separator according to an exemplary embodiment of the present invention includes a porous substrate and a coating layer including inorganic particles and a binder on one surface or both surfaces of the porous substrate, wherein the binder includes a copolymer including: (a) a unit derived from (meth)acrylamide; (b) a unit derived from any one or more selected from (b-1) (meth) acrylic acid and (b-2) a (meth)acrylic acid salt; and (c) a unit derived from an addition-polymerizable monomer containing a sulfonate.

When the coating layer is formed by coating a composition including the binder, a thermal shrinkage rate of the separator was significantly lowered even with a use of a relatively low content of a binder, and a problem of inorganic particles in the coating layer being detached and separated is improved, and a short circuit may be suppressed when an electrochemical device is overheated.

Hereinafter, the above configuration will be described in detail.

[Porous Substrate]

In an exemplary embodiment of the present invention, the porous substrate is commonly used in the art and may be a woven fabric, a non-woven fabric, a porous film, or the like, but is not limited thereto.

The material of the porous substrate is not limited, but specifically, for example, polyolefins such as polyethylene and polypropylene, polyesters such as polyethylene terephthalate and polybutylene terephthalate, polyacetal, polyamide, polyimide, polycarbonate, polyether ether ketone, polyarylether ketone, polyetherimide, polyamideimide, polybenzimidazole, polyethersulfone, polyphenylene oxide, cyclic olefin copolymers, polyphenylene sulfide, polyethylene naphthalate, glass fiber, Teflon, polytetrafluoroethylene, and the like may be used, and the material may be formed of a resin of any one or two or more selected from the group consisting thereof.

More specifically, the porous substrate may be a polyolefin-based porous substrate which may be adjusted for finer pores, but is not limited thereto.

The polyolefin-based porous substrate is usually produced in the form of a film and is not limited as long as it is commonly used as a separator of a lithium secondary battery, and an example thereof includes polyethylene, polypropylene, copolymers thereof, and the like, but is not necessarily limited thereto.

The thickness of the porous substrate is not particularly limited, and for example, may be 1 to 100 μm, specifically 5 to 80 μm, and more specifically 6 to 50 μm, but is not limited thereto.

[Coating Layer]

In an exemplary embodiment of the present invention, the coating layer is formed on one surface or both surfaces of the porous substrate, and may be coated on the entire surface of one side surface.

The thickness is not particularly limited, and the coating layer may be coated at a thickness of, for example, 0.01 to 10 μm, specifically 1 to 5 μm, but the thickness is not limited thereto. A weight per unit area of the coating layer may be 1 to 100 g/m², but is not necessarily limited thereto.

The coating layer may have contents of the inorganic particles and the binder at a weight ratio of inorganic particles:binder of 50:50 to 99.9:0.1, specifically 80:20 to 99.9:0.1, more specifically 90:10 to 99:1, and still more specifically 95:5 to 99:1. Since a binder having a specific structure is applied in the present invention, a composite separator, which has excellent adhesiveness of inorganic particles, may prevent desorption of particles, and has a significantly low thermal shrinkage rate, may be provided, even with a use of the binder at a very low content, specifically at a weight ratio of 1 to 5. In addition, since the composition has a low viscosity, leveling properties are improved.

In an exemplary embodiment of the present invention, the coating layer may be formed by applying a composition including inorganic particles and a binder.

More specifically, for example, the composition may include the inorganic particles and the binder, and more specifically, may include the inorganic particles, the binder, and a solvent. In addition, the solid content may be 5 to 40 wt %, and within the solid content range, the viscosity may be 1000 cps or less. More specifically, the viscosity may be 500 cps or less, more specifically 100 cps or less. Since a composition having a low viscosity may be provided, the composition may have excellent coatability and leveling properties to form a uniform and smooth coating layer. When the viscosity satisfies the above range, a coating layer in which it is easy to adjust a coating amount and which has a small thickness and a smooth surface may be formed, and since penetration into the porous substrate is easy and internal resistance of the separator is low, output properties of a battery may be improved. In the case in which the viscosity is rather too low, when the composition is applied to the porous substrate, it may seep out to the opposite surface or it is difficult for the inorganic particles to be supported inside the pores of the porous substrate so that desorption may occur, and a roll may be contaminated during production.

Since a specific binder described in the following is applied as the binder, the viscosity stability and adhesiveness of the composition including the binder may be achieved even with a use of a low content of the binder, and the coatability and leveling properties of the composition are significantly improved, so that a uniformly and smoothly formed coating layer may be provided on the porous substrate.

The binder includes a copolymer including: (a) a unit derived from (meth)acrylamide; (b) a unit derived from any one or more selected from (b-1) (meth)acrylic acid and (b-2) a (meth)acrylic acid salt; and (c) a unit derived from an addition-polymerizable monomer containing a sulfonate.

More specifically, the copolymer may include 49 to 98 mol % of (a), 1 to 50 mol % of (b-1)+(b-2), and 0.0001 to 1 mol % of (c), and more specifically, 70 to 95 mol % of (a), 5 to 30 mol % of (b-1)+(b-2), and 0.05 to 0.5 mol % of (c), but is not necessarily limited thereto. When the binder including the copolymer is prepared in the above range, the viscosity of the composition including the binder may be lowered, sufficient adhesive strength may be obtained even with a use of a lower content of the binder, and a composite separator having a lower thermal shrinkage rate and a lower resistance may be provided.

Here, (b-1) and (b-2) may be included at a mole ratio of 0:100 to 10:90, but are not necessarily limited thereto. When the binder including the copolymer is prepared in the above range, the viscosity of the composition including the binder may be lower and the coatability of the composition may be better.

More specifically, (b-1) and (b-2) may be included at a mole ratio of 1:99 to 2:98. That is, (b-1) and (b-2) may be included so that the mole ratio of (b-2)/(b-1) may be 49 to 99, but are not necessarily limited thereto. When the binder including the copolymer is prepared in the above range, a composite separator having a lower thermal shrinkage rate and a lower resistance may be obtained while maintaining a low viscosity, excellent adhesive strength, and excellent coatability of the composition including the binder.

(a) The unit derived from (meth)acrylamide may be represented by the following Chemical Formula 1:

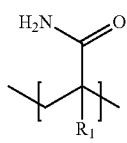

[Chemical Formula 1]

wherein $R_1$ is hydrogen or a C1 to C6 alkyl group.

The unit derived from any one or more selected from (b-1) (meth)acrylic acid and (b-2) (meth)acrylic acid salt may be represented by the following Chemical Formula 2 and Chemical Formula 3. That is, the unit represented by the following Chemical Formula 2, the unit represented by the following Chemical Formula 3, or both of the units represented by Chemical Formulae 2 and 3 may be included:

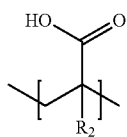

[Chemical Formula 2]

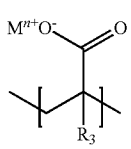

[Chemical Formula 3]

wherein $R_2$ and $R_3$ are independently of each other hydrogen or a C1 to C6 alkyl group, $M^{n+}$ is a cation having an oxidation number of n, and n is an integer of 1 to 3.

For example, when n is 1, $M^{n+}$ may be $Li^+$, $Na^+$, $K^+$ or $NH_4^+$. M is a metal such as, when n is 2, Ca or Mg, and when n is 3, Al or Ga. (c) The unit derived from an addition-polymerizable monomer containing a sulfonate may be used without major limitation as long as it is a monomer containing a sulfonate.

Specifically, for example, the unit (c) may include any one or more monomers selected from, for example, a methallylsulfonic acid alkali salt and acrylate, an allyl monomer, a styrenic monomer, and a vinyl monomer having a sulfonate as a substituent, and the like, but is not necessarily limited thereto.

In addition, the unit may be represented by the following Chemical Formula 4:

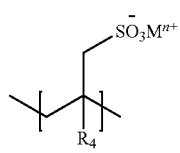

[Chemical Formula 4]

wherein $R_4$ is selected from hydrogen or C1 to C6 alkyl groups, and $M^{n+}$ is a cation having an oxidation number of n, and n is an integer of 1 to 3.

For example, when n is 1, $M^{n+}$ may be $Li^+$, $Na^+$, $K^+$, or $NH_4^+$. M is a metal such as, when n is 2, Ca or Mg, and when n is 3, Al or Ga. More specifically, the copolymer may include a unit wherein in Chemical Formulae 1 to 4, $R_1$, $R_2$, and $R_3$ are hydrogen and $R_4$ is methyl. In addition, $M^{n+}$ may be $Li^+$, $Na^+$, $K^+$, or $NH_4^+$.

The copolymer may have a weight average molecular weight of 300,000 g/mol or more, specifically 300,000 g/mol to 2,000,000 g/mol, and more specifically 500,000 to 2,000,000 g/mol, but is not necessarily limited thereto. In a weight average molecular weight range satisfying the above, the adhesive strength may be further improved. The weight average molecular weight is an average molecular weight in terms of polysaccharide measured using gel permeation chromatography.

The copolymer may be prepared by various methods known in the art such as emulsion polymerization, suspension polymerization, mass polymerization, solution polymerization, or bulk polymerization.

An aqueous solution including the binder including the copolymer at a solid content of 10 wt % may have a viscosity of 3000 cps or less, specifically 2500 cps or less, and more specifically 2000 cps or less, but is not limited thereto. When the slurry is prepared by mixing with inorganic particles, the viscosity of the slurry may be further lowered and coatability may be further improved.

The copolymer further includes a crosslinkable unit, thereby further lowering the viscosity of the binder, and the crosslinkable unit may be derived from a reactive monomer containing a hydroxyl group. Though it is not limited thereto, more specifically, for example, a repeating unit derived from N-methylolacrylamide may be further included.

The crosslinkable unit may be added at 5 mol % or less, specifically at 1 to 5 mol % in the entire binder polymer.

In addition, the binder may further include a crosslinking agent, if necessary. The crosslinking agent may be any one or a mixture of two or more selected from glycol-based compounds and polyol compounds. Specifically, for example, though it is not limited thereto, pentaerythritol, polyvinyl alcohol, ethylene glycol, and the like may be used. By adding the crosslinking agent, the composition including the binder achieves the high adhesiveness to be desired in the present invention even with a use of a lower content of the binder to significantly improve thermal shrinkage, which is thus preferred.

The content of the crosslinking agent may be used within a range which does not increase a crosslinking degree so that the viscosity of the binder is not greatly increased. For example, the content is not limited as long as the viscosity of the aqueous solution including the binder at a solid content of 10 wt % satisfies a range of 3000 cps or less.

However, the viscosity is not necessarily limited in the present invention, and even a viscosity higher than the range may be used as long as the coatability of the composition is secured and there is no problem in coating smoothness.

In an exemplary embodiment of the present invention, a solvent used in the composition for forming the coating layer may be a polar aprotic solvent or a polar protic solvent such as acetone, tetrahydrofuran, dimethylformamide, and N-methyl-2-pyrrolidone may be used, and specifically water may be used.

In an exemplary embodiment of the present invention, the inorganic particles used in forming the porous coating layer are not particularly limited as long as they are electrochemically stable.

A non-limiting example of the inorganic particles includes boehmite, $CeO_2$, MgO, CaO, ZnO, $Al_2O_3$, $TiO_2$, $BaTiO_3$, $HfO_2$, $SrTiO_3$, $SnO_2$, NiO, $ZrO_2$, $Y_2O_3$, SiC, $BaTiO_3$, and the like, but is not necessarily limited thereto. In addition, these may be used alone or in combination of two or more.

In an exemplary embodiment of the present invention, the size of the inorganic particles is not limited, but for imparting smooth coating and excellent electrical properties, the size may be in a range of 10 nm to 10 μm. Within the range, dispersibility or coatability and desorption of particles may be prevented, but the present invention is not necessarily limited thereto.

It is preferred that the composition is prepared usually by adding the inorganic particles to an aqueous solution including the binder and then sufficiently crushing the inorganic particles using a ball mill to pulverize aggregates.

In an exemplary embodiment of the present invention, the aqueous solution including the binder may have a pH of 5 or more, specifically 5.5 or more, and within the range, dispersibility of the inorganic particles may be further improved.

A method of coating the composition in which the inorganic particles are dispersed on the porous substrate is not particularly limited, but the solution may be coated on one surface or both surfaces of the porous substrate by various methods such as roll coating, spin coating, dip coating, bar coating, die coating, slit coating, and ink-jet printing without limitation.

[Lithium Secondary Battery]

In an exemplary embodiment of the present invention, the composite separator produced by the above method may be applied to an electrochemical device, and an example of the electrochemical device may include a lithium secondary battery. Since the electrochemical device is well known and its configuration is also known, it will not be described in detail in the present invention.

The lithium secondary battery according to an exemplary embodiment of the present invention may include the composite separator described above between a positive electrode and a negative electrode. Here, the positive electrode and the negative electrode may be used without limitation as long as they are commonly used in the lithium secondary battery.

Hereinafter, the present invention will be described in more detail with reference to the Examples and Comparative Examples. However, the following Examples and Comparative Examples are only an example for describing the present invention in more detail, and do not limit the present invention in any way.

[Method of Measuring Physical Properties]

1. Weight Average Molecular Weight

Measurement was performed by using GPC (EcoSEC HLC-8320 GPC Refractive Index detector from Tosoh Corporation), TSKgel guard PW×1, two columns of TSKgel GMPW×1 and TSKgel G2500PW×1 (7.8×300 mm) were connected as a GPC column, a 0.1 M aqueous $NaNO_3$ solution was used as a solvent, polysaccharide was used as a standard, and analysis was performed at 40° C. at a flow rate of 1 mL/min.

2. Viscosity

Viscosity was measured at 25° C. by setting rpm to a torque of 60-70% by a Brookfield viscometer (model RVDV2), spindle of CPA-52Z.

3. Adhesive Strength

A composite separator was cut into a size of 50 mm×50 mm and placed with a coating layer being on the top. A sheet of black drawing paper (20 mm×150 mm×T 0.25 mm) was placed thereon, and a constant pressure (10 $g/cm^2$) was applied using a presser. The black drawing paper was forcefully pulled aside, a degree of inorganic substance adhered on the surface was confirmed, and a degree was determined as A/B/C/D/F depending on the adhered degree, as follows:

A: no adhesion

B: inorganic substance adhered in a small amount

In C-F, the binder and the inorganic substance were adhered together and the degree became more severe toward F.

4. Coatability

Coatability of the composite separator produced in the Examples and the Comparative Examples was visually evaluated.

Excellent: uniformly and smoothly coated.

Normal: portions having a non-uniform coating thickness, for example, pin holes occurring.

Bad: stripes formed by application or coated more thickly than a desired thickness.

5. Evaluation of Thermal Resistance

The composite separator was cut into a square shape with a side of 10 cm and a transverse direction (TD) and a machine direction (MD) were indicated. A sample was placed in the center, 5 sheets of paper were placed each on and under the sample, and the four sides of the paper were wrapped with a tape. The sample wrapped in paper was allowed to stand in a hot air drying oven at 150° C. for 60 minutes. Thereafter, the sample was taken out of the oven, the separator was measured with a camera, and a shrinkage rate in a machine direction (MD) of the following Mathematical Formula 1, and a shrinkage rate in a transverse direction (TD) of the following Mathematical Formula 2 were calculated:

Shrinkage rate in machine direction (%)=(length in machine direction before heating−length in machine direction after heating)×100/length in machine direction before heating    [Mathematical Formula 1]

Shrinkage rate in transverse direction (%)=(length in transverse direction before heating−length in transverse direction after heating)×100/length in transverse direction before heating    [Mathematical Formula 2]

6. Resistance Characteristics of Secondary Battery

Each battery produced by an assembly process according to the Examples and the Comparative Examples was charged at a constant current-constant voltage (CC-CV) of 4.2 V using a charge/discharge cycle instrument, and then discharged (rate controlling: 0.5 C 0.5 C). Direct current internal resistance therefrom was measured.

Here, a resistance when a porous substrate having no coating layer formed was used as a separator (Resistance 1) and a resistance when a separator having a coating layer formed on one surface of the porous substrate was used (Resistance 2) were measured, respectively, and a difference value was calculated as follows and is shown in Table 2.

ΔResistance=Resistance 2−Resistance 1

Example 1

[Preparation of Aqueous Polymer]

The inside of a 0.5 L flask was replaced with nitrogen, then 40 g of acrylamide, 14.6 g of acrylic acid, 0.3 g of sodium methallylsulfonate salt, and 311 g of distilled water were added to the flask, and then the flask was heated to 60° C. Thereafter, 0.114 g of potassium persulfate as a polymerization initiator was added to the flask, and a polymerization reaction was performed. 15 hours after the reaction, the flask was exposed to the air to stop the polymerization reaction, the temperature was lowered to room temperature, 182 ml of a 1 M sodium hydroxide solution and distilled water were added to prepare a 10 wt % aqueous solution was prepared, and then the pH and the viscosity of the solution were measured. The results are shown in the following Table 1.

[Preparation of Coating Solution]

97 wt % of boehmite particles (γ-AlO(OH), available from Nabaltec, Apyral AOH60) having an average particle diameter of 700 nm as non-conductive particles and the 10 wt % aqueous solution prepared above were added to water as a solvent to be 3 wt % based on the solid content of the polymer, and stirring was performed to prepare a composition having a solid content concentration of 30 wt %. The viscosity of composition was measured, and is shown in the following Table 2.

[Production of Composite Separator]

As a porous substrate, a polyolefin microporous film product (ENPASS, SK ie technology) having a width of 150 mm, a length of 1000 M, and a thickness of 9 μm was used. The coating solution prepared above was bar-coated on one surface of the porous substrate at a speed of 3 m/min to form a coating layer. After application, the substrate was passed through a hot air drier at 40° C. to be dried and was wound in a roll shape. After winding, the thickness of the coated separator was measured as a total of 12 μm and the thickness of the coating layer was measured as 3 μm. The thermal resistance of the thus-prepared composite separator were evaluated, and are shown in the following Table 2.

[Production of Battery]

95 wt % of artificial graphite as a negative electrode active material, 3 wt % of acrylic latex having Tg of −52° C. (solid content of 20 wt %), and 2 wt % of carboxymethyl cellulose (CMC) as a thickener were added to water and stirring was performed to prepare a uniform negative electrode slurry. The slurry was coated on a copper foil having a thickness of 20 μm, dried, and pressed to produce a negative electrode plate having a thickness of 150 μm.

94 wt % of $LiCoO_2$ as a positive electrode active material, 2.5 wt % of polyvinylidene fluoride as a fusion agent, and 3.5 wt % of carbon black as a conductive agent were added to N-methyl-2-pyrrolidone (NMP) as a solvent and stirring was performed to prepare a uniform positive electrode slurry. The slurry was coated on an aluminum foil having a thickness of 30 μm, dried, and pressed to produce a positive electrode plate having a thickness of 150 μm.

The composite separator produced above was laminated between the positive electrode and the negative electrode produced above to assembly a pouch type battery.

A functional layer-formed separator was disposed on a notched positive electrode. A notched negative electrode was disposed on the opposite side of the positive electrode of the separator, with the surface facing the functional layer-formed separator to assembly the battery in a pouch type. An electrolyte solution to which ethylene carbonate (Ec)/ethylmethyl carbonate (EMC)/dimethyl carbonate (DMC)=25:45:20 (volume ratio) in which 1 M lithium hexafluorophosphate (LiPF6) was dissolved was added, was injected into the each assembled battery. Heat sealing to 165° C. was performed for sealing the opening of an aluminum packaging material to close an aluminum exterior. Thus, a pouch type lithium ion secondary battery of 650 mAh was produced. The resistance of the thus-obtained lithium ion secondary battery was evaluated by the method described above, and is shown in Table 2.

Example 2

A 10 wt % aqueous polymer solution was prepared in the same manner as in Example 1, and then 0.52 g of pentaerythritol was added as a crosslinking agent to prepare a solution. The results are shown in the following Table 1.

In addition, a coating solution was prepared in the same manner as in Example 1, a separator was produced, and then a battery was produced. The physical properties are shown in the following Table 2.

Example 3

The inside of a 0.5 L flask was replaced with nitrogen, then 7.82 g of acrylic acid, 54 ml of 2M LiOH, and 100 ml of distilled water were added to the flask, and stirring at room temperature was performed. After stirring for 1 hour, 20 g of acrylamide, 0.14 g of a sodium methallylsulfonate salt, 0.89 g of N-methylolacrylamide, and 151 g of distilled water were added thereto, and the flask was heated to 50° C. Thereafter, 0.058 g of potassium persulfate as a polymerization initiator was added to the flask, and a polymerization reaction was performed. 15 hours after the reaction, the flask was exposed to the air to stop the polymerization reaction to prepare a 10 wt % aqueous solution, and then the pH and the viscosity of the solution were measured. The results are shown in the following Table 1.

In addition, a coating solution was prepared in the same manner as in Example 1, a separator was produced, and then a battery was produced. The physical properties are shown in the following Table 2.

Example 4

The inside of a 0.5 L flask was replaced with nitrogen, then 40 g of acrylamide, 4 g of acrylic acid, 0.13 g of a sodium methallylsulfonate salt, and 250 g of distilled water were added to the flask, and then the flask was heated to 50° C. Thereafter, 0.16 ml of tetraethylenediamine and 0.059 g of potassium persulfate as a polymerization initiator were added to the flask, and then a polymerization reaction was performed. 15 hours after the reaction, the flask was exposed to the air to stop the polymerization reaction, the temperature was lowered to room temperature, 53 ml of a 1 M sodium hydroxide solution and distilled water were added to prepare a 10 wt % aqueous solution, and then the pH and the viscosity of the solution were measured. The results are shown in Table 1.

In addition, a coating solution was prepared in the same manner as in Example 1, a separator was produced, and then a battery was produced. The physical properties are shown in the following Table 2.

Example 5

The inside of a 0.25 L flask was replaced with nitrogen, and 15 g of acrylamide, 5.45 g of acrylic acid, 0.12 g of a sodium methallylsulfonate salt, and 117 g of distilled water were added to the flask, and then the flask was heated to 50° C. Thereafter, 0.08 ml of tetraethylenediamine and 0.027 g of potassium persulfate as a polymerization initiator were added to the flask, and then a polymerization reaction was performed. 15 hours after the reaction, the flask was exposed to the air to stop the polymerization reaction, the temperature was lowered to room temperature, 75 ml of a 1 M lithium hydroxide solution and distilled were added to prepare a 10 wt % of an aqueous solution, and then the pH and the viscosity of the solution were measured. The results are shown in the following Table 1.

In addition, a coating solution was prepared in the same manner as in Example 1, a separator was produced, and then a battery was produced. The physical properties are shown in the following Table 2.

Example 6

The inside of a 0.25 L flask was replaced with nitrogen, then 15 g of acrylamide, 5.23 g of acrylic acid, 0.6 g of sodium methallylsulfonate salt, and 49 g of distilled water were added to the flask, and then the flask was heated to 50° C. Thereafter, 0.027 g of potassium persulfate as a polymerization initiator was added to the flask, and a polymerization reaction was performed. The process was performed in the same manner as in Example 1, except that 15 hours after the reaction, the flask was exposed to the air to stop the polymerization reaction, the temperature was lowered to room temperature, 72 ml of a 1 M lithium hydroxide solution and distilled water were added to prepare a 10 wt % aqueous solution, and then the pH and the viscosity were measured. The results are shown in Table 1.

In addition, a coating solution was prepared in the same manner as in Example 1, a separator was produced, and then a battery was produced. The physical properties are shown in the following Table 2.

Comparative Example 1

The inside of a 0.5 L flask was replaced with nitrogen, then 15 g of acrylamide, 5.5 g of acrylic acid, and 166 g of distilled water were added to the flask, and then the flask was heated to 60° C. Thereafter, 0.42 ml of tetraethylenediamine and 0.078 g of potassium persulfate as a polymerization initiator were added to the flask, and a polymerization reaction was performed. 15 hours after the reaction, the flask was exposed to the air to stop the polymerization reaction, the temperature was lowered to room temperature, a 2 M lithium hydroxide solution and distilled water were added to prepare a 10 wt % aqueous solution, and then the pH and the viscosity were measured. The results are shown in the following Table 1.

In addition, a coating solution was prepared in the same manner as in Example 1, a separator was produced, and then a battery was produced. The physical properties are shown in the following Table 2.

Comparative Example 2

The inside of a 0.5 L flask was replaced with nitrogen, then 30 g of acrylamine, 0.14 g of a sodium methallylsulfonate salt, and 171 g of distilled water were added to the flask, and then the flask was heated to 50° C. Thereafter, 0.114 g of potassium persulfate as a polymerization initiator was added to the flask, and a polymerization reaction was performed. 15 hours after the reaction, the flask was exposed to the air to stop the polymerization reaction, the temperature was lowered to room temperature, a 1 M sodium hydroxide solution and distilled water were added to prepare a 10 wt % aqueous solution, and then the pH and the viscosity were measured. The results are shown in the following Table 1.

In addition, a coating solution was prepared in the same manner as in Example 1, a separator was produced, and then a battery was produced. The physical properties are shown in the following Table 2.

Comparative Example 3

The inside of a 0.5 L flask was replaced with nitrogen, then 15 g of acrylamide, 5.5 g of acrylic acid, and 166 g of distilled water were added to the flask, and then the flask was heated to 60° C. Thereafter, 0.14 ml of tetraethylenediamine and 0.026 g of potassium persulfate as a polymerization initiator were added to the flask, and a polymerization reaction was performed. 15 hours after the reaction, the flask was exposed to the air to stop the polymerization reaction, the temperature was lowered to room temperature, a 2 M lithium hydroxide solution and distilled water were added to prepare a 10 wt % aqueous solution, and then the pH and the viscosity were measured. The results are shown in the following Table 1.

In addition, a coating solution was prepared in the same manner as in Example 1, a separator was produced, and then a battery was produced. The physical properties are shown in the following Table 2.

TABLE 1

| | Component (mol %) | | | | | Cross-linking agent (mol %) | pH | Mw ($\times 10^3$) | Viscosity of 10 wt % aqueous solution (cps) |
| --- | --- | --- | --- | --- | --- | --- | --- | --- | --- |
| | AM | AA | AA salt | SMAS | HMAM | | | | |
| Example 1 | 73.34 | 2.64 | 23.77 | 0.25 | — | — | 6.3 | 1140 | 1296 |
| Example 2 | 73.34 | 2.64 | 23.77 | 0.25 | — | 0.5 | 6.3 | 1140 | 1296 |
| Example 3 | 70.42 | — | 27.16 | 0.22 | 2.2 | — | 8.4 | 590 | 382 |
| Example 4 | 90.90 | 0.45 | 8.52 | 0.13 | — | — | 8.7 | 1230 | 2500 |
| Example 5 | 73.42 | 0.27 | 26.05 | 0.26 | — | — | 8.0 | 800 | 486 |

TABLE 1-continued

| | Component (mol %) | | | | | Cross-linking agent (mol %) | pH | Mw (×10³) | Viscosity of 10 wt % aqueous solution (cps) |
|---|---|---|---|---|---|---|---|---|---|
| | AM | AA | AA salt | SMAS | HMAM | | | | |
| Example 6 | 73.43 | 0.25 | 25 | 1.32 | — | — | 8.1 | 230 | 47 |
| Comparative Example 1 | 73 | 27 | — | — | — | — | 8.3 | 850 | 7200 |
| Comparative Example 2 | 99.8 | — | — | 0.2 | — | — | 8.4 | 560 | 1009 |
| Comparative Example 3 | 73 | 27 | — | — | — | — | 8.0 | 1990 | 41000 |

In the above Table 1,
Am is acrylamide,
AA is acrylic acid,
AA salt is an acrylic acid salt,
SMAS is a sodium methallylsulfonate salt, and
HMAM is N-methylolacrylamide.

TABLE 2

| | Viscosity of coating solution composition (cps) | Adhesive strength | Coatability | Shrinkage rate (%) MD | Shrinkage rate (%) TD | ΔResistance (mΩ) |
|---|---|---|---|---|---|---|
| Example 1 | 60 | A | Excellent | 1.3 | 1.3 | 30 |
| Example 2 | 60 | A | Excellent | 1.3 | 1.3 | 20 |
| Example 3 | 27 | A | Excellent | 2.0 | 2.1 | 26 |
| Example 4 | 95 | A | Excellent | 2.2 | 2.3 | 32 |
| Example 5 | 40 | A | Excellent | 1.0 | 1.3 | 21 |
| Example 6 | 10 | B | Excellent | 4.8 | 4.2 | 33 |
| Comparative Example 1 | 160 | A | Normal | 2.2 | 2.7 | 55 |
| Comparative Example 2 | 20 | A | Excellent | 1.9 | 1.7 | 74 |
| Comparative Example 3 | 220 | A | Bad | 4.0 | 3.8 | 28 |

As seen from the above Table 2, it was confirmed in Examples 1 to 6 that the viscosity of the coating solution composition was very low, adhesive strength was excellent, coatability was excellent, and a shrinkage rate was low. In addition, it was confirmed that when applied to a battery, the battery had a low resistance.

The composite separator according to an exemplary embodiment of the present invention has excellent adhesive strength, does not cause desorption of inorganic particles, and has significantly improved thermal shrinkage, even with a use of a small amount of a binder.

In addition, the present invention may not cause inorganic particles forming a coating layer to be released under a stress occurring in a manufacturing process of a battery, and thus, may provide an effect of suppressing a short circuit even in the case of overheating.

In addition, the composition has a low viscosity to have excellent leveling properties and coatability, a uniform and flat surface may be formed, unwanted stripes may be decreased, and an effect of excellent coatability and impregnability to a porous substrate may be provided. In addition, by adopting the composite separator, an electrochemical device having a low resistance, improved stability, and excellent electrical properties may be provided.

Hereinabove, although the present invention has been described by specific matters, limited exemplary embodiments, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A composite separator comprising:
a porous substrate; and
a coating layer consisting essentially of inorganic particles and a binder formed on one surface or both surfaces of the porous substrate,
wherein the binder comprises a copolymer comprising: (a) a unit derived from (meth)acrylamide; (b) a unit derived from (b-1) (meth)acrylic acid and (b-2) a (meth)acrylic acid salt; and (c) a unit derived from an addition-polymerizable monomer containing a sulfonate, and
wherein the unit derived from any one or more selected from (b-2) the (meth)acrylic acid salt is selected from a compound represented by the following Chemical Formula 3:

[Chemical Formula 3]

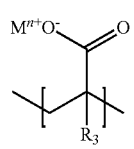

wherein $R_3$ is hydrogen or a C1 to C6 alkyl group, and $M^{n+}$ is $Li^+$, $Na^+$, $K^+$, $NH_4^+$, $Ca^{2+}$, $Mg^{2+}$, $Al^{3+}$ or $Ga^{3+}$.

2. The composite separator of claim 1, wherein (a) the unit derived from (meth)acrylamide is selected from a compound represented by the following Chemical Formula 1, the unit derived from (b-1) (meth)acrylic acid is selected from a compound represented by the following Chemical Formula 2, and (c) the unit derived from an addition-polymerizable monomer containing a sulfonate is selected from a compound represented by the following Chemical Formula 4:

[Chemical Formula 1]

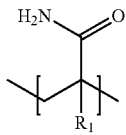

wherein $R_1$ is hydrogen or a C1 to C6 alkyl group,

[Chemical Formula 2]

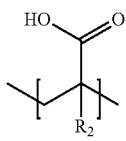

wherein $R_2$ is hydrogen or a C1 to C6 alkyl group,

[Chemical Formula 4]

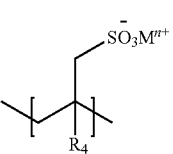

wherein $R_4$ is selected from hydrogen or C1 to C6 alkyl groups, $M^{n+}$ is a cation having an oxidation number of n, and n is an integer of 1 to 3.

3. The composite separator of claim 2, wherein $R_1$, $R_2$, and $R_3$ are hydrogen, and $R_4$ is methyl.

4. The composite separator of claim 1, wherein the copolymer further comprises a repeating unit derived from N-methylolacrylamide.

5. The composite separator of claim 1, wherein the copolymer comprises: 49 to 98 mol % of (a), 1 to 50 mol % of (b-1)+(b-2), and 0.0001 to 1 mol % of (c), and
(b-1):(b-2) is at a mole ratio of 1:99 to 10:90.

6. The composite separator of claim 1, wherein the binder further comprises a crosslinking agent.

7. The composite separator of claim 6, wherein the crosslinking agent is any one or a mixture of two or more selected from glycol-based compounds and polyol compounds.

8. The composite separator of claim 1, wherein the copolymer has a weight average molecular weight of 500,000 to 2,000,000 g/mol.

9. The composite separator of claim 1, wherein a content ratio of the inorganic particles: the binder is 80:20 to 99.9:0.1 by weight.

10. The composite separator of claim 1, wherein the composite separator has a thermal shrinkage rate both in a machine direction (MD) and in a transverse direction (TD) of 5% or less after being allowed to stand at 150° C. for 1 hr.

11. The composite separator of claim 10, wherein the thermal shrinkage rate is 3% or less both in the machine direction and in the transverse direction.

12. The composite separator of claim 1, wherein the coating layer is formed by applying a composition consisting essentially of the inorganic particles and the binder.

* * * * *